July 5, 1927.
A. R. COON
1,634,650
UNITARY FRAME FOR FARM IMPLEMENTS
Filed April 2, 1926     2 Sheets-Sheet 1
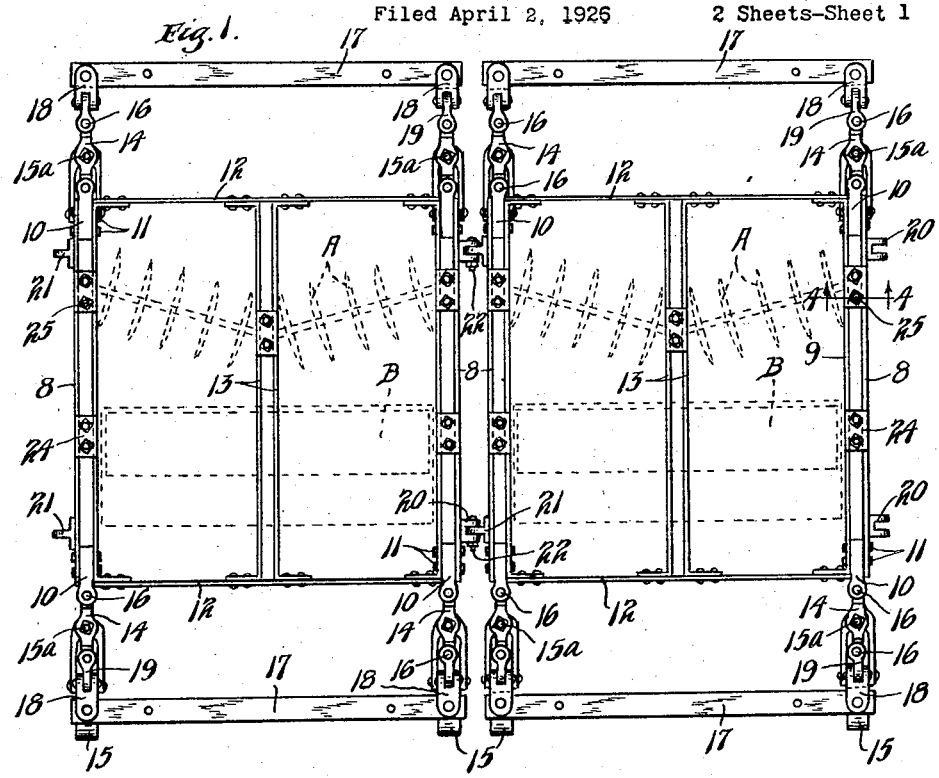
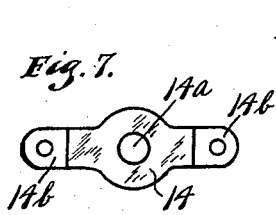
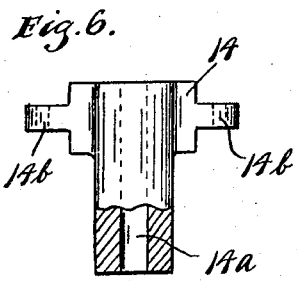
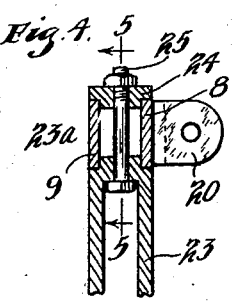
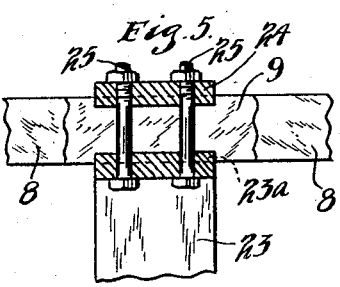
INVENTOR.
ALVIN R. COON.
BY HIS ATTORNEYS.

July 5, 1927.
A. R. COON
1,634,650
UNITARY FRAME FOR FARM IMPLEMENTS
Filed April 2, 1926    2 Sheets-Sheet 2
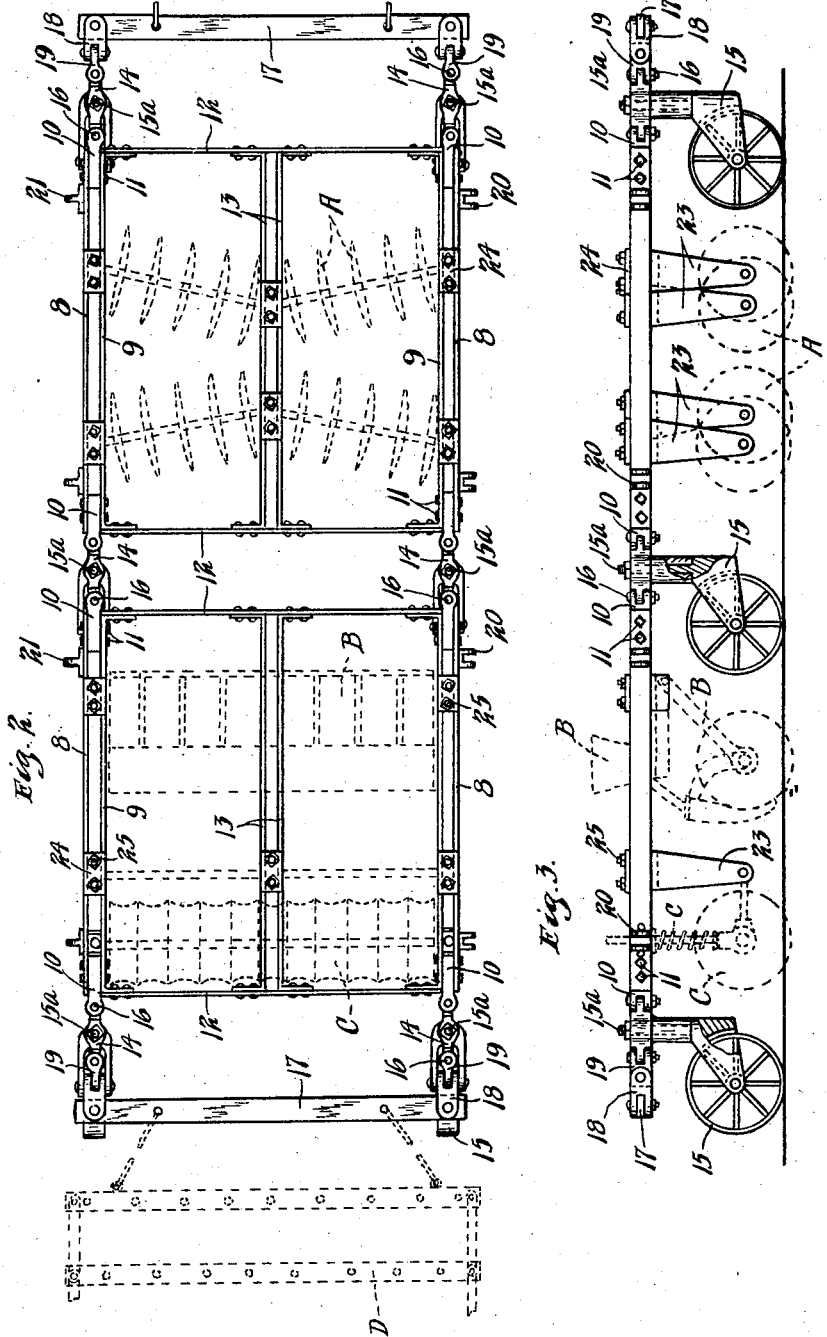
INVENTOR.
ALVIN R. COON.
BY HIS ATTORNEYS.

Patented July 5, 1927.

1,634,650

UNITED STATES PATENT OFFICE.

ALVIN R. COON, OF CHESTER, MONTANA.

UNITARY FRAME FOR FARM IMPLEMENTS.

Application filed April 2, 1926. Serial No. 99,270.

This invention relates to frames or mountings for farm implements and machinery and especially to wheeled mountings adapted to carry the various implements employed for preparing and seeding the soil.

Where farming is done on a large scale, especially in the raising of grain, it is highly desirable to have facilities for working large areas of soil quickly and for utilizing the maximum traction power available. Moreover, with the increased cost of labor it is necessary to provide efficient means whereby a relatively small number of men may do a maximum amount of work. In farming on a large scale the conditions of the soil in various fields differ so widely that it is necessary for the farmer to have efficient means for treating the soil in a variety of different ways. To purchase the complete standard implements on the market at this time requires a large outlay of capital.

It is an object of this invention to provide a device comprising a plurality of unitary frames especially adapted for carrying soil treating and seeding implements in various arrangements and capable of being closely coupled together in either side by side or tandem arrangement as desired to form continuous devices. Thus the farming elements may be arranged as desired upon the several frames and the frames may be arranged or coupled to suit the conditions of the particular piece of land to be treated. If the treatment of the soil is to be light, a greater number of the unitary frames carrying the implements may be coupled together in side by side arrangement and may be employed behind the tractor or other source of power. The farmer is thus able to obtain the maximum amount of work from his available power.

A further object of the invention is to provide in such a device highly efficient means for coupling the several unitary frames together in side by side or tandem arrangement and to further provide readily detachable trucks at the ends of the frames, said trucks being mounted on caster wheels and including the coupling members.

It is an additional object to provide unitary wheeled frames capable of being housed in a small amount of space and especially constructed to have one or several ground working elements attached thereto in any desired transverse positions thereon. The frames are consequently provided with slotted sides and central members adapted to receive the shanks or uprights of various standardized implements of farm machinery.

Another object of the invention is to provide a continuous device or piece of farm machinery consisting of a plurality of unitary sections hinged together to conform to the contour of the ground on which employed.

These and other objects of the invention will be apparent from the following description made in connection with the accompanying drawings wherein like characters refer to similar parts throughout the several views, and in which Fig. 1 is a plan view of two of the unitary frames connected in parallel or side by side arrangement.

Fig. 2 is a plan view of the same frames connected in tandem arrangement with two of the trucks removed for so doing.

Fig. 3 is a side elevation of Fig. 2.

Fig. 4 is a cross section taken on the line 4—4 of Fig. 1 showing the structure of one of the depending supports for the attachment of farm implements.

Fig. 5 is a vertical section taken on the line 5—5 of Fig. 4.

Fig. 6 is a detailed elevation with some portions broken away showing one of the coupling members in which one of the wheels is mounted.

Fig. 7 is a plan view of the same.

In the drawings the device is shown as comprising only two of the unitary frames, although of course it is understood that any desirable number thereof may be used.

In identifying the several parts of the device by reference characters, a single unitary frame will be referred to. The frame comprises slotted sides, each formed from a pair of spaced parallel bars 8 and 9 respectively, disposed edgewise and spaced apart by blocks 10, hitherto referred to as hinge members, clamped between the end portions of said bars by means of the bolts 11. Members 10 have forked ends projecting beyond the ends of the frame and vertically apertured to provide female hinge members. The inner bars 9 of the frame have their extremities inturned at ninety degrees. The frame ends constituting bars 12 are secured across said inturned portions. A central slotted frame member is formed by means of spaced bars 13 disposed parallel with the sides of the frame and secured to the central portions of the frame ends 12.

Each frame is mounted on a pair of readily detachable trucks hinged to the ends thereof, the trucks each preferably comprising a pair of coupling members 14 having depending sleeves or sockets 14ª to receive the pivot shanks 15ª of caster wheels 15. Coupling members 14 have horizontally extending tongues 14ᵇ at either end thereof vertically apertured to be aligned with apertures in hinge members 10, whereby the trucks may be readily hinged to the ends of the frame by inserting coupling bolts 16. The lower extremities of sleeves 14ª form efficient bearing surfaces for the forked frames of the caster wheels.

Each unitary frame is provided with one of said trucks at either end and a pair of eveners comprising bars 17 having their clevises 18 pivoted for vertical swinging movement to forked hinge members 19 adapted to be coupled to the outwardly extending tongues 14ᵇ at either end of the device formed, or to the frames. A plurality of unitary frames may be secured together by coupling members 14 in the manner described, the truck at one end being first removed and the free end of the truck between the two frames being pivotally connected by bolts 16 to the hinge members 10 on the adjacent end of the second frame.

To couple two or more frames together in side by side arrangement, hinge members are provided on outer bars 8 of the frame sides. Thus, outwardly projecting spaced forked hinge members 20 are provided on one side of each frame while tongued hinge members 21 are provided on the opposite side. These hinge members are horizontally apertured to receive pivot bolts 22 (see Fig. 1).

Each of the unitary frames is provided with a plurality of depending supports 23 to which are attached certain standardized farm implements, such as discs, drills, pressers, etc. Supports 23 at their upper ends are provided with flanged portions 23ª adapted to snugly fit the slots formed by the spaced bars 8 and 9 constituting the frame sides. A clamping plate 24 is provided for each of supports 23 through which the upstanding bolts 24 rigidly carried at the top of supports 23, may be passed and the device securely clamped to the sides of the frame. It will be apparent that the position of these supports may be varied as desired upon the sides of the frames. Thus, the implements may be attached in any desired transverse or diagonal position beneath the frame.

In the drawings the several standardized implements are diagrammed in dotted lines, such as the discs, indicated by the letter A, the drill B, the drill press C, and the drag D, attached to the rear evener. It will be seen that the slotted sides of the frame receive the upright shanks of the standardized implements attached, and moreover furnish seats at the lower edges thereof for the pressure springs on the implements. Thus, in Fig. 3 the pressure spring c is interposed between the roller and the frame bars 8 and 9.

Operation.

The operation of the above described device or devices may be briefly summarized as follows:

When it is desired to form a relatively wide continuous device, a plurality of the unitary frames are hooked up in side by side or parallel arrangement by securing the bolts 22 through hinged members 20 and 21 respectively of two frames. When the frames are hooked up in parallel arrangement the front and rear trucks are of course employed on both frames. It will be noticed that the frames are coupled together in very close relation and form a continuous device or implement. In seeding or discing one of the rows is planted between the spaced frame bars 8 and 9 and the distance between the adjacent sides of the two frames is approximately the distance required between two rows. It will of course be apparent that due to the hinges formed by members 20 and 21 the several sections of the continuous device may swing as required to conform to the contour of the ground. This is of course a distinct advantage.

When it is desired to couple the frames in tandem arrangement the second frame is simply drawn up behind the first and one of the trucks removed as well as the evener at the end of the adjacent frame. Coupling members 14 may then be connected to the adjacent forked hinge members by coupling pins 16. The coupling members 14 will then be disposed between the two adjacent frames and as has been stated, the caster wheels 15 are carried between the frames. It is usually desirable, when the frames are connected in tandem arrangement, to remove one of the bolts 11 in each of the hinge members 10 on one of the frames. By so doing the separate frames or sections will be capable of vertical swinging movement to conform to the particular contour of the land.

It will of course be apparent that the truck between two unitary frames is hinged to each frame, and being mounted on caster wheels, will readily permit the device to make the turns.

When the device is formed with the several frames in side by side arrangement it is often desirable to transport the same from one field to another and it is often necessary to pull the device through a relatively narrow passage or gate. In this case one of the eveners may be attached to the end frame and to the hinge members 20 and 21 on the end frame and the caster wheels are readily turned to permit the device to be drawn sidewise through the narrow passage.

From the above description it will be apparent that I have invented a simple but highly efficient device comprising units adapted to carry standardized farm implements which may be arranged in a multiplicity of different manners to suit the particular conditions as required. The farmer with my device may add unitary frames from time to time as required without considerable additional expense according to his needs.

It will also be apparent that the several frames may be quickly detached and the caster wheels removed as desired and may then be stacked in a relatively small amount of space. In the fall and winter time the frames and trucks may be used if desired for hauling and other purposes familiar to the farmer.

It will of course be understood that various changes may be made in the form, details, proportions and arrangement of parts without departing from the scope of the invention.

What is claimed is:

1. A device of the class described having in combination a plurality of wheel supported unitary frames, each having spaced sides, means for hingedly securing said frames together in tandem arrangement, means for hingedly securing said frames together in side by side arrangement, and means on each of said frames for attaching one or more implements thereto between said sides in a plurality of different lateral positions.

2. A device of the class described having in combination a plurality of unitary frames, coupling members detachably and pivotally connected to the ends of each of said frames, said coupling members including wheels adapted to support said frames, and means for pivotally securing said frames together in tandem arrangement.

3. A frame of the class described having in combination side members, a plurality of coupling members, one adapted to be hinged adjacent each corner of said frame, and a wheel mounted beneath each coupling member adapted to support said frame.

4. A unitary frame of the class described comprising sides and ends, hinge members carried by said sides adapted to pivotally secure said frame to another similar frame in side by side arrangement, castor wheels adjacent the corners of said frame, and coupling devices in which said castor wheels are swivelled each having pivotal connections adjacent each end thereof for connection with the ends of said frame sides.

5. A device of the class described having in combination a plurality of unitary frames, hinge members secured adjacent the ends of said frames, coupling members adapted to be pivotally connected to said hinge members or to couple a plurality of said frames together and caster wheels supporting said coupling members.

6. A device of the class described having in combination a plurality of unitary frames, each comprising spaced parallel sides, caster wheels mounted adjacent each corner of said frame, means for removably mounting said caster wheels, means for hingedly attaching two or more of said frames together in side by side arrangement and means for securing two or more of said frames together in tandem arrangement.

7. A unitary frame of the class described having in combination sides each comprising a pair of parallel spaced bars, and members connecting said sides, front and rear trucks pivotally connected to said frame and supporting members passing through said spaced bars and adapted to be readily secured thereto in various positions thereon.

8. A frame of the class described having in combination parallel sides, a pair of hinge members at each end, trucks pivoted to said hinge members comprising coupling members provided with substantially vertical sleeves and caster wheels having their pivoted shanks journaled in said sleeves.

9. A device of the class described having in combination a plurality of unitary frames each comprising spaced vertically slotted sides, a pair of vertically apertured forks at each end of each of said frames and wheeled trucks for said frames each comprising a pair of coupling members having horizontally extending tongues adapted to be hinged to said forks and wheels supporting said coupling members, and swivelled therein.

In testimony whereof he does affix his signature.

ALVIN R. COON.